United States Patent
Goldberg et al.

(10) Patent No.: US 7,607,257 B2
(45) Date of Patent: Oct. 27, 2009

(54) AUTOMATIC WATERING APPARATUS FOR HOUSEPLANTS

(76) Inventors: Leonard Goldberg, 6716 Joy Rd., East Syracuse, NY (US) 13057; James P. Romano, 2112 E. Colvin St., Syracuse, NY (US) 13210; John J. Feketa, 100 Seneca Turnpike, Clinton, NY (US) 13323

( * ) Notice: Subject to any disclaimer, the term of this patent is extended or adjusted under 35 U.S.C. 154(b) by 584 days.

(21) Appl. No.: 11/277,801

(22) Filed: Mar. 29, 2006

(65) Prior Publication Data

US 2006/0260187 A1 Nov. 23, 2006

Related U.S. Application Data

(60) Provisional application No. 60/594,320, filed on Mar. 29, 2005.

(51) Int. Cl.
*A01G 27/00* (2006.01)
(52) U.S. Cl. ............................................. 47/48.5; 47/79
(58) Field of Classification Search ................. 47/48.5, 47/79, 59 R, 62 R, 62 N, 63
See application file for complete search history.

(56) References Cited

U.S. PATENT DOCUMENTS

| | | | |
|---|---|---|---|
| 4,001,967 A | 1/1977 | Swift et al. | |
| 4,241,538 A | 12/1980 | Lahr | |
| 4,829,709 A | 5/1989 | Centafanti | |
| 4,834,265 A | 5/1989 | Snyder | |
| 4,850,386 A | 7/1989 | Bireley | |
| 4,873,790 A | 10/1989 | Laterza | |
| 4,937,972 A | 7/1990 | Freitus | |
| 5,062,239 A * | 11/1991 | Helton | 47/79 |
| 5,097,626 A | 3/1992 | Mordoch | |
| 5,546,700 A * | 8/1996 | Kumpf | 47/79 |
| 5,749,170 A | 5/1998 | Furuta | |
| 5,956,899 A | 9/1999 | DiOrio | |
| 7,222,454 B1 | 5/2007 | Chen | |
| 2003/0140557 A1 | 7/2003 | Lyon | |
| 2004/0059509 A1 | 3/2004 | Anderson et al. | |
| 2005/0199842 A1 | 9/2005 | Parsons et al. | |
| 2005/0240313 A1 | 10/2005 | Cartwright | |
| 2006/0290360 A1 | 12/2006 | Lee | |
| 2007/0145984 A1 | 6/2007 | McDermid | |

OTHER PUBLICATIONS

Thomson, Ross, Using Soil Moisture Sensors for Making Irrigation Management Decisions in Virginia, Aug. 1996.
Hymer, Moran, Keefer, Monitoring Temporal Soil Moisture Variability With Depth Using Calibrated In-Situ Sensors.
http://www.aquapro-sensors.com, A Complete Moisture Sensing and Control System.
http://www.decagon.com/Ech2o/theory, Theory of ECH20 Probes' Operation.

* cited by examiner

*Primary Examiner*—T. Nguyen
(74) *Attorney, Agent, or Firm*—Anthony L. Meola

(57) ABSTRACT

An automatic plant watering apparatus having a cavity for receiving a standard houseplant pot, a reservoir for holding water, a pump for removing water from the reservoir, a host for delivering water from the pump to a plant positioned in the cavity. The pump is operated by a microcontroller that is programmed to measure a first time period during which the pump is not operated, and a second time period during which the pump is operated. According, the apparatus can be programmed to automatically water a house plant at predetermined intervals, as well as deliver a predetermined amount of water.

14 Claims, 2 Drawing Sheets

AUTOMATIC WATERING APPARATUS FOR HOUSEPLANTS

The present application claims priority to U.S. Provisional Application Ser. No. 60/594,320, filed on Mar. 29, 2005.

FIELD OF THE INVENTION

The invention relates generally to the field of horticulture and more specifically to the areas of hardware intended for the care and maintenance of house plants.

BACKGROUND OF THE INVENTION

Many people grow plants in their homes. House plants need water to survive. However, people often travel and thus people who keep plants in their homes are not always home to water them. It is often true that many people also simply forget to water their plants and as a result the plants wither and die. It would, therefore, be useful to have a device that would automatically water a plant at regular intervals. As many people take extended vacations and are away from home for days or weeks, the present invention would be able to provide the plant with water while the owner was away, or otherwise relieve the owner of the task of periodic watering.

There are numerous devices having pumps and timers for watering plants, and certainly such systems exist for watering lawns and gardens. Commercial systems also exist for watering fruits and vegetables inside grocery stores. However, none of these systems provide for automatically and regularly watering house plants and the like with predetermined amounts of water while the owner is away or otherwise preoccupied.

OBJECTS OF THE INVENTION

The primary object of the present invention is to prove an automatic watering device for house plants, said device consisting of a reservoir, a pump, a controller and a power source operatively connected to allow a selected amount of water to be delivered to the plant at any number of predetermined intervals. A further object of the invention is to provide a reservoir shaped in such a fashion as to hold the plant and its pot. Another object of the invention is to provide for the watering of multiple plants. Yet another object of the invention is to optionally provide for an AC powered pump. A further object of the invention is to provide a similar device for outdoor use wherein the pump's batteries are augmented with solar cells and the soil containing the plant is monitored to prevent over watering.

SUMMARY OF THE INVENTION

In accordance with the foregoing objects and advantages, the present invention comprises a water tank (reservoir) operatively constructed with a cavity to accept a standard size pot for a houseplant. Houseplants are commercially available in several standard size containers. Generally, 4 inches to 10-inch diameter tapered pots are the most popular. The reservoir device of the present invention is also fitted with a filler plug and attachments points for an optional hanger. Near the bottom of the reservoir tank, an output tube is operatively connected to a pump driven by a low voltage motor, which is controlled by an microcontroller, and powered by a battery or batteries. A flexible hose is interconnected to the output of the pump and placed in communication with the plant to be watered. The microcontroller circuit is designed to allow the pump to start and stop at regular intervals, selected either at manufacture or (in an alternate embodiment) by the user. The interval at which the pump is activated is, of course, the number of times a day the plant receives or is supposed to receive water. The duration of the pump's "on" time determines the amount of water the plant receives. Both the interval and duration of pumping are functions of the microcontroller.

It should be noted here that having a built-in plant cavity in the reservoir tank (while useful to contain overflow and seepage) is not strictly necessary for the utility of this device. Said plants could easily sit outside the reservoir as long as the watering tube can reach them. Further several pump device can be attached to a single reservoir for the purpose of watering several plants simultaneously. Since the controller is a microprocessor-based circuit, the program written for it to execute determines its functionality. The controller's primary function is to turn the pump motor on and off at programmed intervals and durations. A detailed description of the controller and its program will be found later in this application. For simplicity, both interval and duration times are fixed in the sample program submitted, although it should be noted that the program can take additional inputs, and based on these inputs, alter either or both of the interval and duration parameters.

DETAILED DESCRIPTION OF THE INVENTION

Figure 1:
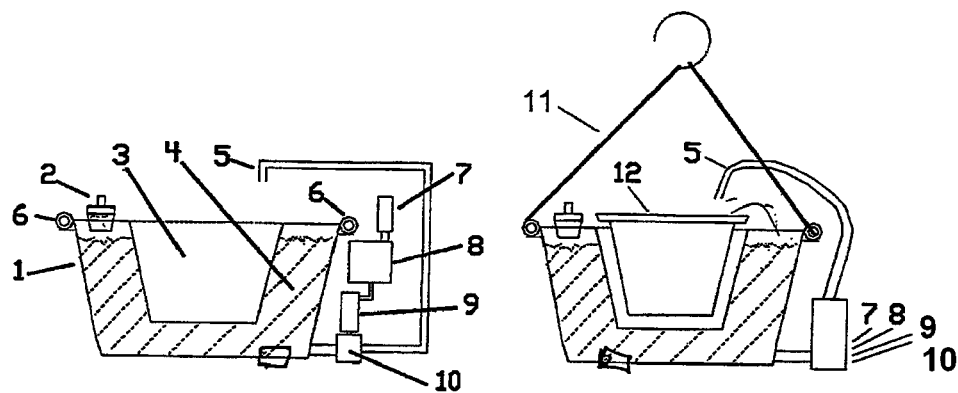
FIG. 1 is a side view of a self-watering apparatus according to the present invention.

Referring now to the drawings, wherein like numerals refer to like parts throughout, there is seen in FIG. 1, a reservoir tank 1 comprising a hollow vessel operatively constructed to hold water and to be filled by removing filler plug 2. Reservoir 1 can be of any size or shape but preferably constructed to allow the inclusion of a plant holder cavity 3, the size of which corresponds to that of a standard size flowerpot. In this embodiment, the example cited is that of a 10-inch circular tapered pot 12. The size of reservoir 1 is therefore determined by the size of the pot 12 and also the amount of water 4 it is designed to hold. Reservoir 1 is fitted with attachment points 6 for hangers 11 in the event the user wishes to hang the plant instead of setting it on a surface. Output tube 13 is located near the bottom of reservoir 1 and is operatively connected to pump 10. By locating the input of pump 10 near the lower level of the water supply, pump priming issues are negated or minimized.

A low voltage direct current motor 9 drives pump 10. Flexible output tube 5 is positioned over the plant once pot 12 is placed in the holder. Controller 8 receives its power from battery 7 and, under program control, counts a predetermined interval in hours, minutes and seconds. Upon completion of that interval, pump 10 is turned on for a predetermined duration. The rate of water delivery by pump 10 is determined by design and testing and once determined the amount of time the pump is on, i.e., the duration can be determined and programmed into the controller. The present program is set to deliver one-half cup (8 oz.) of water to the plant at twelve-hour intervals.

Figure 2:
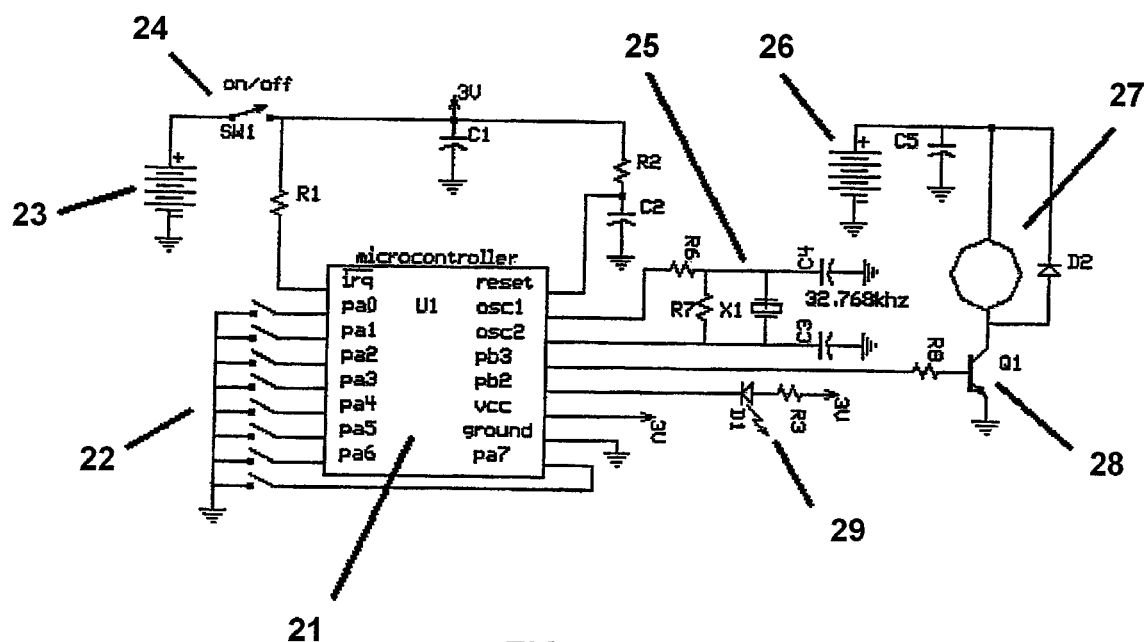
FIG. 2 is a schematic of control circuitry according to the present invention.

Referring to FIG. 2, microcontroller 21 can be commercially available low power unit, such as Motorola 68HC705KJ1. Battery 23 supplies 3 VDC to operate the process. On/off switch 24 is included to turn the unit off when operation is not desired. R1, C1, R2 and C2 are common components necessary for proper startup and operation of the processor. Crystal 25 sets the processors operating frequency at 32.768 kilohertz, a convenient frequency from which to develop a time base measured in seconds. R6, R7, C3 and C4 are components of the oscillator circuit necessary to sustain oscillation at the correct frequency. Also the use of this frequency allows the processor to operate at very low current level. This, along with power saving programming techniques allows for a sufficiently long battery life in the order of a year or more of continuous use. The processor pin labeled PB2 flashes the attached LED 9 once every 5 seconds as an indication to the user that the system is working. The processor pin labeled PB3 is attached through resistor R8 to transistor Q1 28. When this pin goes HIGH, the transistor is turned on allowing current to flow from Battery 26 through motor 27 to ground, causing the motor to spin. Causing the pin to go LOW shuts the motor off. C5 and D2 are included to mitigate electrical motor noise. The length of time PB3 is held high by the program is the "pump duration time." Battery 26 is separate from battery 23 since the motor requires a much higher current level than the processor to operate. Battery 26 is considered here to be a single standard "D" cell that will operate the pump motor for about a year. Batteries 23 and 26 can be replaced by design with larger or smaller capacity units as needed for various applications.

Figure 3:
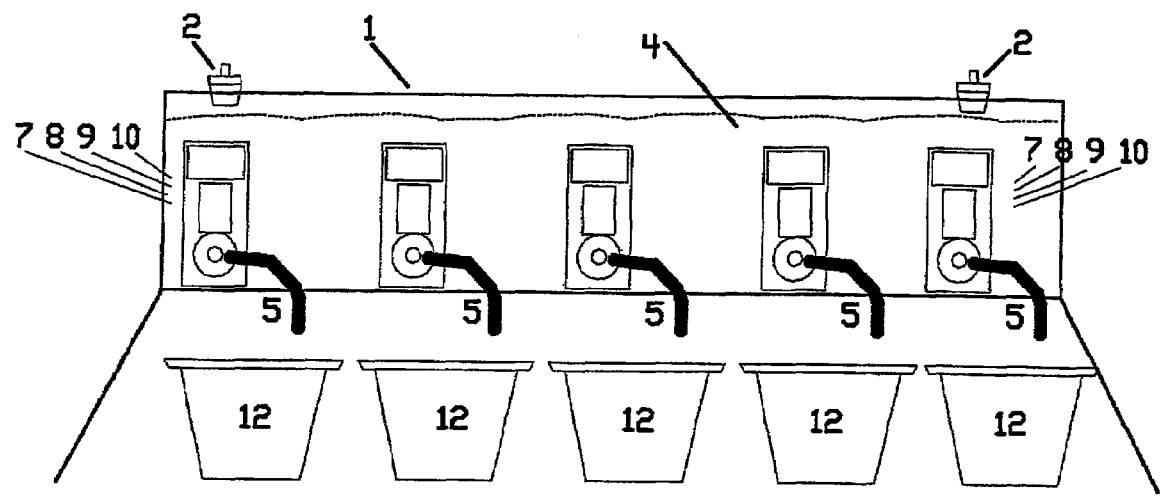
FIG. 3 is a side view of an alternative embodiment according to the present invention.

An assembly language program used by the processor is included hereinafter. FIG. 3. Software program

```
; PROGRAM NAME kjpump2.asm
; MODIFIED KJPUMP 5/6/04
; ORIG -04/26/2004
; CIRCUIT IS INTENDED TO RUN WITH 32.768 KHZ XTAL
BLINK       EQU $C1
SEC         EQU $C2
MINUT       EQU $C3
HOURS       EQU $C4
PUMPON      EQU $C5
PFLAG       EQU $C6
TOF         EQU $C7
            ORG $300
            ; ---- SET UP PORT DATA AND DDR'S
            ; ---- DATA----
SETUP   LDA #$00
            STA 00          ;PORT A DATA
            LDA #$04
            STA 05          ;PORT B
            CLR  TOF
            CLR  BLINK
            CLR  SEC
            CLR  MINUT
            CLR  HOURS
            CLR  PUMPON
            CLR  PFLAG
            ;---INITIALIZE TIMER OVERFLOW INTERRUPT----
            CLR  $08         ;TIMER STATUS AND CONTROL REGISTER
            BSET 5,08        ;ENABLE TMR OVERFLO INTERRUPT
            BCLR 3,01        ;PUMP OFF
            BSET 2,01        ;LED OFF
IDLE        NOP
            WAIT             ; GO INTO LOW POWER MODE WAITING FOR TMR INTERRUPT
            BRSET 1, PFLAG, PUMP
            JMP IDLE
PUMP    BSET 3,01        ;TURN THE PUMP ON
            CLR PUMPON       ;RESET ON TIME REGISTER
P2          LDA PUMPON
            CMP #$1E         ;DECIMAL 30 [30 SECONDS]
            BNE P2
            BCLR 3,01        ;PUMP OFF
            JMP SETUP
;----Timer Interrupt Service Routine ----------
TISR    BSET 3,08        ;RESET THE TMR OVERFLO FLAG
            BCLR 3,08
            INC TOF          ;COUNT TIMER OVERFLOWS
            LDA TOF
            CMP #$0F         ;16 TIMES=1 SECOND
            BNE TMOUT
            CLR TOF
            INC SEC
            INC PUMPON       ;INCREMENT PUMPON EVERY SECOND
            INC BLINK
            LDA BLINK
            CMP #$05         ;BLINK LED EVERY 5 SECONDS
            BNE TSR2
            BCLR 2,01        ;LED ON
            BSET 2,01        ;LED OFF
            CLR BLINK
```

-continued

```
TSR2    LDA SEC
        CMP #$3C        ;DECIMAL 60 [60SEC OR 1 MINUTE]
        BNE TMOUT
        CLR SEC
        INC MINUT
        LDA MINUT
        CMP #$3C        ;DECIMAL 60 [60 MINUTES =1 HOUR]
        BNE TMOUT
        CLR MINUT
        INC HOURS
        LDA HOURS
        CMP #$0C        ;DECIMAL 12 {@12 HOURS DO PUMP SUBROUTINE}
        BNE TMOUT
        CLR HOURS
        BSET 1, PFLAG   ;SET PUMP FLAG ON AT 12 HOUR INTERVALS
TMOUT RTI
;--------------------
EXTINT  RTI
SWI     RTI
        ORG $07F1
        DB $08          ;SOSCD DISABLED
        ORG $07F8
        DW TISR
        DW EXTINT
        DW SWI
        DW SETUP        ;RESET
        END
;----------------------------------------------------------------------------
```

A 32.768 KHz clock is a convenient frequency to use when trying to establish a time base. As 1/32.768 kHz equals 244.14 microseconds and the processor's timer overflows every 1024 clock cycles, each timer overflow is equal to 0.25 seconds. In the sample processor, the timer overflow can be made to generate an interrupt, allowing the process to enter a low power "wait" mode until interrupted by the timer. The reason for this is to assist in reducing battery current draw. The object of the program is to initially set up it's internal registers and then to begin counting timer overflows (240 overflow interrupts equal 1 minute). As each interrupt occurs, a "blink" register is incremented and compared to 5. When equal the processor causes the LED to flash for approximately 1 millisecond, giving a visual indication that the device is functioning. The "blink" register is then cleared. Also as each interrupt occurs, a "seconds" register is incremented and compared to 240. When equal, it is cleared and the "minutes" register is incremented and compared to 60 (1 hour). When equal, the "minutes" register is cleared and the "hours" register is incremented and compared to 12. When equal, the program jumps to the "pump" routine and starts the pump motor running. As the "pump" routine starts, the "seconds" register is cleared and allowed to increment at each timer interrupt until the "duration" is reached. In the sample program reproduced above, the pump is allowed to run for 30 seconds. When the pump is turned off, the program is sent to the beginning of the program in order to begin another 12-hour cycle. Again it should be noted here that the processor has 8 inputs which can be set to either 1 or 0 by means of a switch on each line or by physically opening or shorting the line with a wire or circuit trace. As the "interval" and "duration" numbers are variables in the program, the program can be written to read the input port (PB0-PB7) and alter the interval and duration variables according to the value it reads from the port. Thus, up to 255 variations can be accommodated in the program.

The above description is a simple embodiment of the concept. Several variations on the theme are possible, practical and useful. Referring to FIG. 3, more than one pump 10 can be connected to a common reservoir 1 and be controlled by a common processor 8 or by separate processors 8 in order to service several plants simultaneously. Outdoor versions could also be implemented using the same techniques. Solar panels could be included to augment the batteries. Moisture sensors can be easily implemented to measure the water content in the soil and prevent "on schedule" watering when not necessary as in the case of a rainy day. As an outdoor version is quite likely to encounter rain, provisions can be made in the physical design of the reservoir to collect rainwater to augment the water level in the tank.

Another useful adaption on this theme is to provide a secondary reservoir 1 and pump 8 strictly for the purpose of delivering liquid fertilizer to the plant. Given the long lengths of time that the processor can measure, this secondary system could easily fertilize the plant on a weekly, monthly or longer schedule. Additionally, the DC pump motor 10 can be replaced with an AC submersible pump in applications where a source of AC power is available. Changes to the motor switching circuit may become necessary and the switching transistor circuit (FIG. 2) could be replaced with means suitable for switching alternating current. For example the transistor circuit could be replaced with a Silicon Controlled Switch (SCS) or an optically coupled relay, etc. all of which are able to be driven by the existing microcontroller.

It should be clear from the foregoing descriptions that many variations on the theme are possible and feasible. This application seeks to describe one simple form of the invention for the sake of clarity. It is expressly understood that variations on the implementation of the system described can be made without departing from the spirit and scope of the invention.

What is claimed is:
1. An automatic plant watering apparatus, comprising:
a tank having an inner cavity and an outer cavity, the inner cavity having a bottom surface and two inner walls and the outer cavity having a bottom surface and two outer walls, wherein the bottom surface and the two outer walls of the outer cavity surrounding the bottom surface and the two inner walls of the inner cavity in spaced relation thereto, thereby defining a reservoir therebetween;

a lower tube having a first end and second end, the first end of the lower tube connected to the tank below the bottom surface of the inner cavity;

an electric pump having an input side and output side, the input side of the pump connected to the second end of the lower tube;

an upper tube having a first end and a second end, the first end of the upper tube connected to the output side of the pump; and a microcontroller electrically connected to the pump and programmed to selectively operate said pump without the need for priming.

2. The apparatus of claim 1, further comprising a first timer for measuring a first time period and a second timer for measuring a second timer period.

3. The apparatus of claim 2, wherein said microcontroller prohibits operation of said pump during said first time period and operates said pump during said second time period.

4. The apparatus of claim 3, wherein at least one of said outer walls further includes an opening communicating with said reservoir.

5. The apparatus of claim 4, wherein said inner cavity is shaped to permit a flowerpot to be placed therein.

6. The apparatus of claim 1, wherein said reservoir further comprises a removable filler plug for selectively permitting access to said reservoir.

7. An automatic plant watering apparatus, comprising: a tank having an inner cavity and an outer cavity, the inner cavity having a bottom surface and two inner walls and the outer cavity having a bottom surface and two outer walls, wherein the bottom surface and the two outer walls of the outer cavity surrounding the bottom surface and the two inner walls of the inner cavity in spaced relation thereto, thereby defining a reservoir therebetween; a pump fluidly connected to said reservoir below the bottom surface of the inner cavity so that the pump does not require priming; a microcontroller interconnected to said pump, wherein said microcontroller includes a first timer for measuring a first time period during which said pump is not operated and a second timer for measuring a second timer period during which said pump is operated; and a tube interconnecting said pump and the inner cavity.

8. The apparatus of claim 7, wherein said reservoir further comprises a removable filler plug for selectively permitting access to said reservoir.

9. The apparatus of claim 8, further comprising a battery interconnected to said pump and said microcontroller.

10. The apparatus of claim 9, wherein said microcontroller controls the rate of delivery of said pump.

11. The apparatus of claim 10, wherein said pump communicates with the bottom of said reservoir.

12. The apparatus of claim 11, wherein the microcontroller operates at approximately 32 kilohertz.

13. The apparatus of claim 12, further comprising a light emitting diode interconnected to said microcontroller.

14. The apparatus of claim 13, wherein said microcontroller causes said light emitting diode to blink for a duration of one millisecond.

* * * * *